_Patented Mar. 3, 1953_

2,630,391

UNITED STATES PATENT OFFICE 2,630,391

DRYING OF VEGETABLES

Robert Alexander Spencer Templeton, London, England, assignor to The Farmers' Marketing and Supply Company Limited, London, England, a British company No Drawing. Application March 10, 1949, Serial No. 80,770. In Great Britain March 9, 1948

4 Claims. (Cl. 99—207)

Processes are known according to which vegetables containing starch, such as potatoes, can be converted to a dry powder, which is capable of being preserved indefinitely and utilized for the preparation of mashes and like dishes without the taste of the mash differing in any way from a mash prepared from similar fresh vegetables.

The present invention is an improvement in the process described in the specification of United Kingdom Patent No. 525,043 which provides a process for reducing farinaceous vegetables, such as potatoes, to dry powder comprising boiling the vegetable, treating the boiled vegetable so as to reduce it to a dry powder, in which dry vegetable powder obtained from the same vegetable is added to the freshly boiled vegetable prior to the further treatment thereof. In a modification of the process, instead of adding the dry vegetable powder to the freshly boiled vegetable, the dry powder is added after the freshly boiled vegetable has been reduced to a damp powder.

In carrying out this prior process it has been usual to peel the potatoes or farinaceous vegetables prior to cooking. According to a feature of the present invention, however, the farinaceous vegetable is cooked and dried without being peeled.

In carrying out the present invention the potatoes or farinaceous vegetables are first thoroughly washed to remove all particles of soil and extraneous matter. When this has been done the potatoes or farinaceous vegetables are subjected to any convenient form of cooking, e. g. by steam or water or air, the medium used being arranged to supply convenient temperatures, and after such cooking the vegetables are transferred directly to the subsequent operation.

It has been found that when adding dry vegetable powder to the freshly boiled potatoes or farinaceous vegetables as described in the specification of United Kingdom Patent No. 525,043 it is not in all circumstances necessary separately to mix the dry vegetable powder and the freshly cooked vegetable before the step of final drying and that useful economy may be derived by the elimination of a separate mixing step in such circumstances.

For example, it has been found that if unpeeled cooked potatoes or other farinaceous vegetables, are placed directly into dryer apparatus of the type referred to in the specification of United Kingdom Patent No. 525,043 (a drum heated by steam fitted with a stirring device) then, provided the quantity of dry vegetable powder which it is desired to admix with the freshly boiled potatoes or other farinaceous vegetables is put first into such drum so that the potatoes or other farinaceous vegetables having been cooked but not peeled are received on to a bed of dry material and the stirring device is set into motion, the act of mixing is combined with and forms part of the operation of drying.

It will be obvious that by the elimination of a separate mixing step economies are derived in costs of handling, capital and power. It is found, moreover, that the capacity of the dry particles to penetrate the translucent substances of the cooked potato or other farinaceous vegetable is such that the desired condition of damp powder is quickly realised and the skins of the potato or other farinaceous vegetable are clearly separated by this action in such a way as to give rise to a minimum of wastage.

Further, whereas it is well known the wastage by normal methods of peeling can be so high as to range between 10% and 25% of the initial total weight of the potatoes or other farinaceous vegetables, such loss is reduced to 5% or less by the method herein described as may be ascertained by checking the weight of the skins and eyes which can be taken off by means of a suitable sieve through which the total end product is passed before or after drying. It is sufficient for such sieve to be about size 20 mesh, i. e. to have about 20 meshes per square inch, but depending upon the degree of separation required a finer or coarser sieve can, of course, be used.

It is to be understood that the separation of the peel from the potatoes or other farinaceous vegetables after drying is not limited only to the type of apparatus referred to herein or otherwise in the specification of United Kingdom Patent 525,043, and whether or not a mixture of freshly cooked potatoes or other farinaceous vegetables and dry powder of the same vegetable is first formed or the freshly cooked vegetable is placed as suggested onto a bed of dry vegetable powder, the advantage of separating the skins by the method hereinbefore described is equally beneficial.

I claim:

1. A method of treating a farinaceous vegetable to produce a readily reconstitutable dried product which comprises cooking the vegetable without peeling it, reducing the moisture content of the cooked vegetable by mixture with a readily reconstitutable dry powder obtained from the same kind of vegetable to cause the dry powder particles to penetrate the translucent substance of the unpeeled cooked vegetable and produce a damp powder separated from the skin, eyes and other foreign matter, removing the skin, eyes and other foreign matter before drying the damp powder by the application of heat.

2. A method as claimed in claim 1, in which the unpeeled cooked vegetable is laid upon a bed of a said readily reconstitutable dry powder and the mass of powder and vegetable is then mixed and simultaneously dried by means of heat.

3. A method of treating a farinaceous vegetable to produce a readily reconstitutable dried product which comprises washing the vegetable, cooking the vegetable without peeling it, reducing the moisture content of the vegetable by mixture with a readily reconstitutable dry powder obtained from the same kind of vegetable to cause the dry powder particles to penetrate the translucent substance of the unpeeled cooked vegetable and produce a damp powder separated from the skin, eyes and other foreign matter, removing the skin, eyes and other foreign matter by screening and drying the damp powder by the application of heat.

4. A method as claimed in claim 3, in which the unpeeled cooked vegetable is laid upon a bed of a said readily reconstitutable dry powder and the mass of powder and vegetable is then mixed and simultaneously heated to dry it.

ROBERT ALEXANDER SPENCER
TEMPLETON.

REFERENCES CITED

The following references are of record in the file of this patent:

UNITED STATES PATENTS

| Number | Name | Date |
| --- | --- | --- |
| 1,025,373 | Cooke | May 7, 1912 |
| 1,295,162 | Heimerdinger | Feb. 25, 1919 |
| 2,490,431 | Greene et al. | Dec. 6, 1949 |

OTHER REFERENCES

Ser. No. 254,739, Volpertas (A. P. C.), published July 13, 1943.